UNITED STATES PATENT OFFICE.

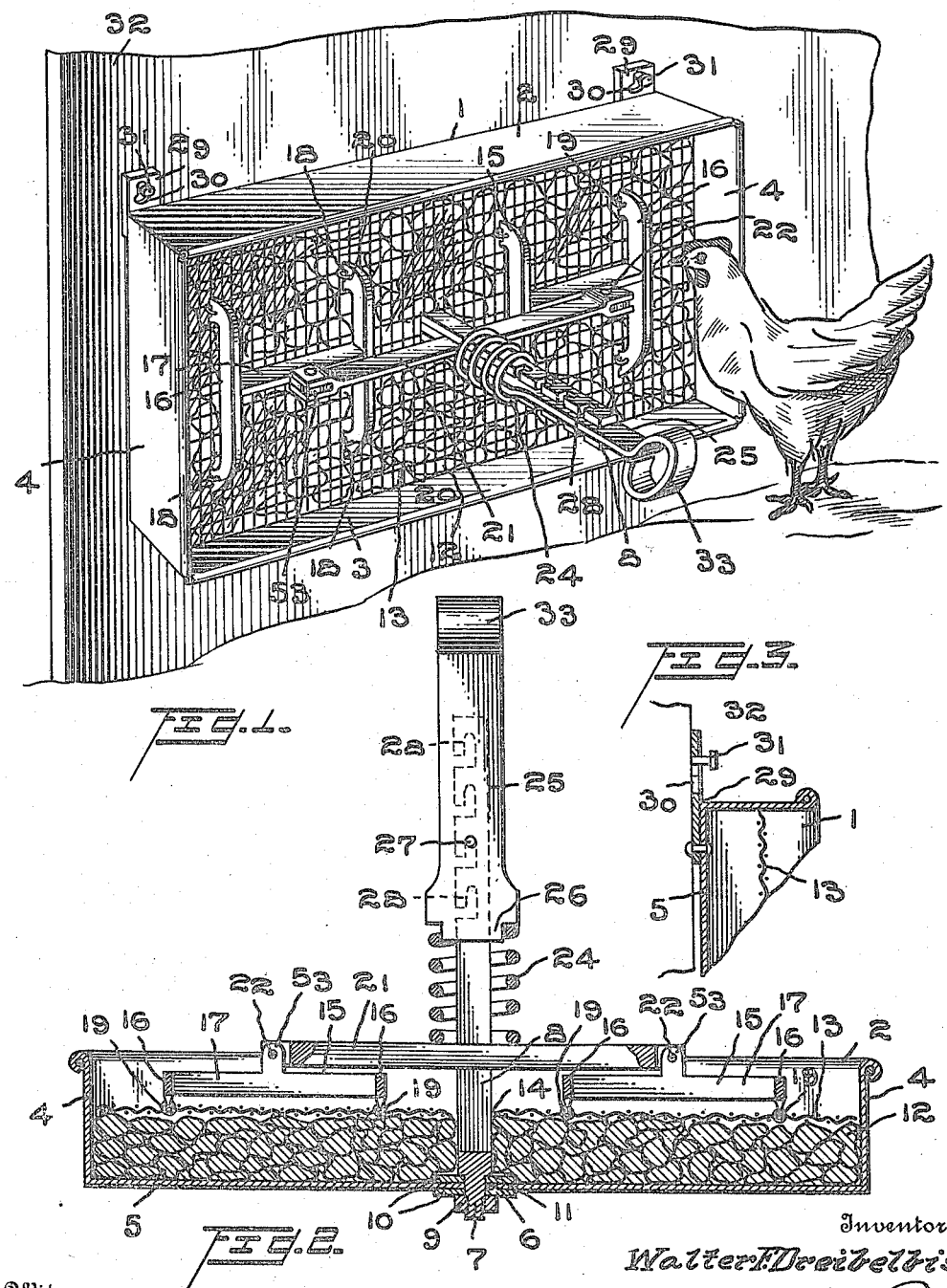

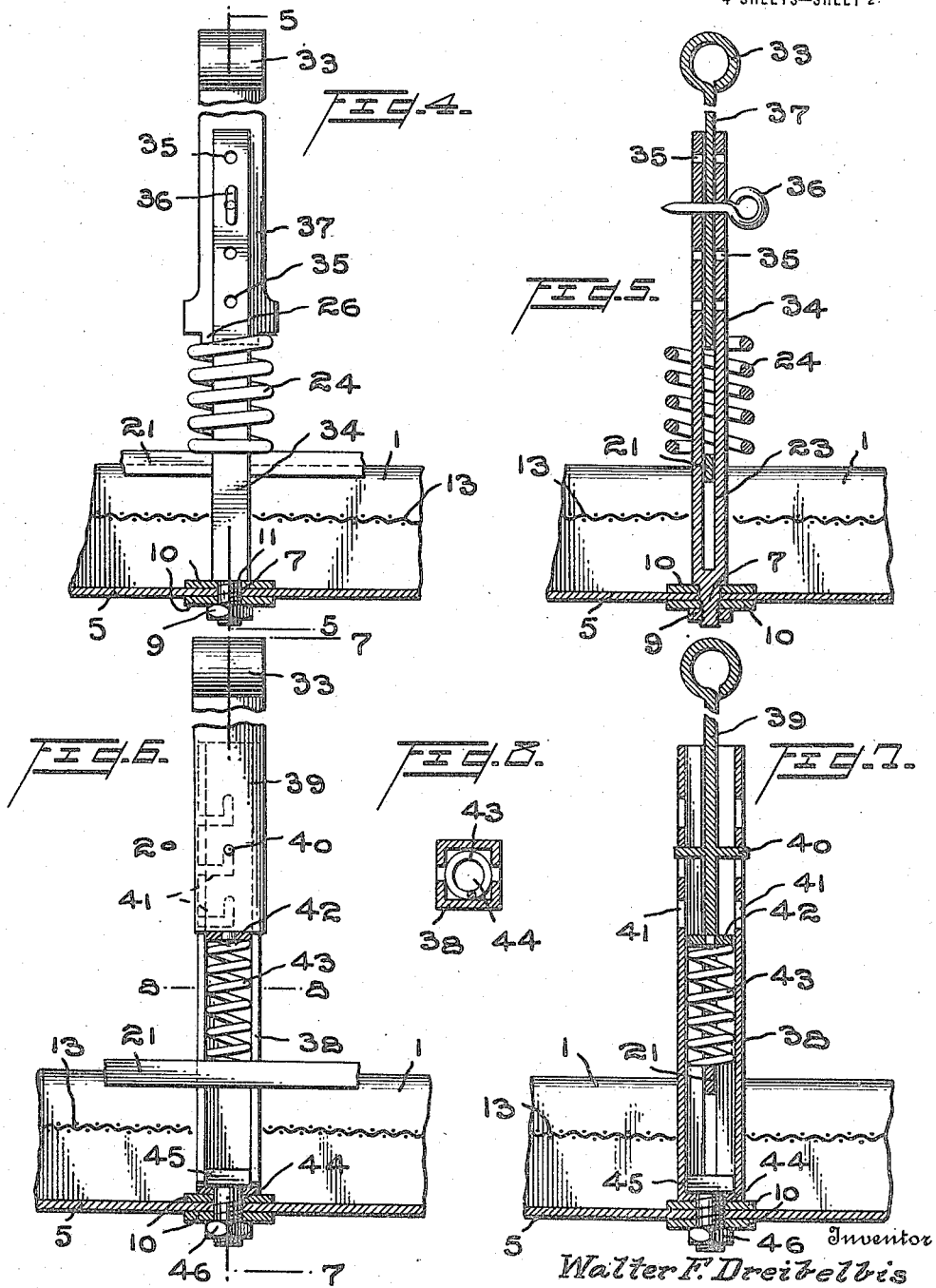

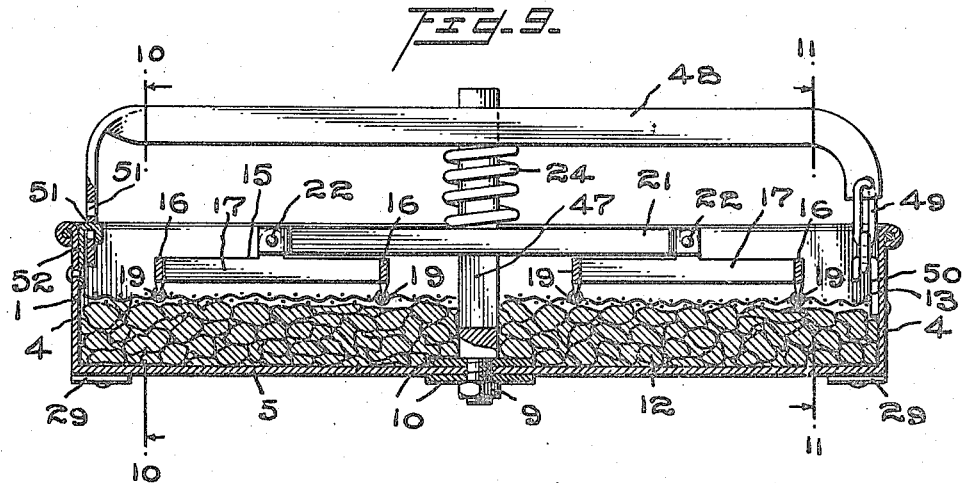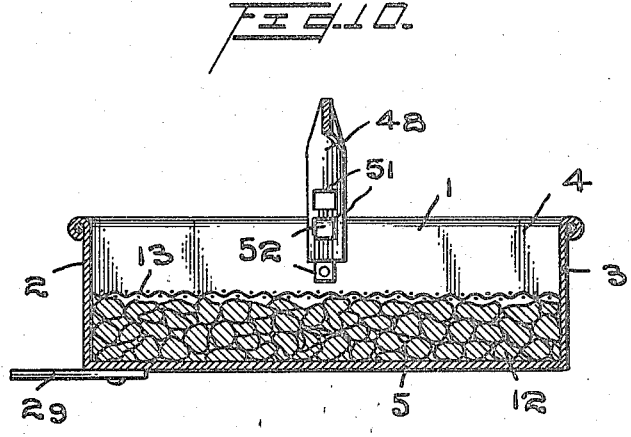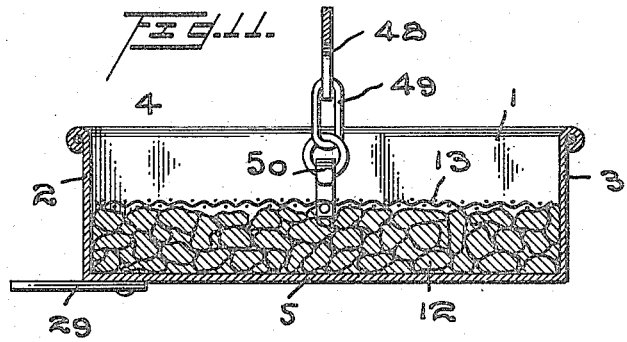

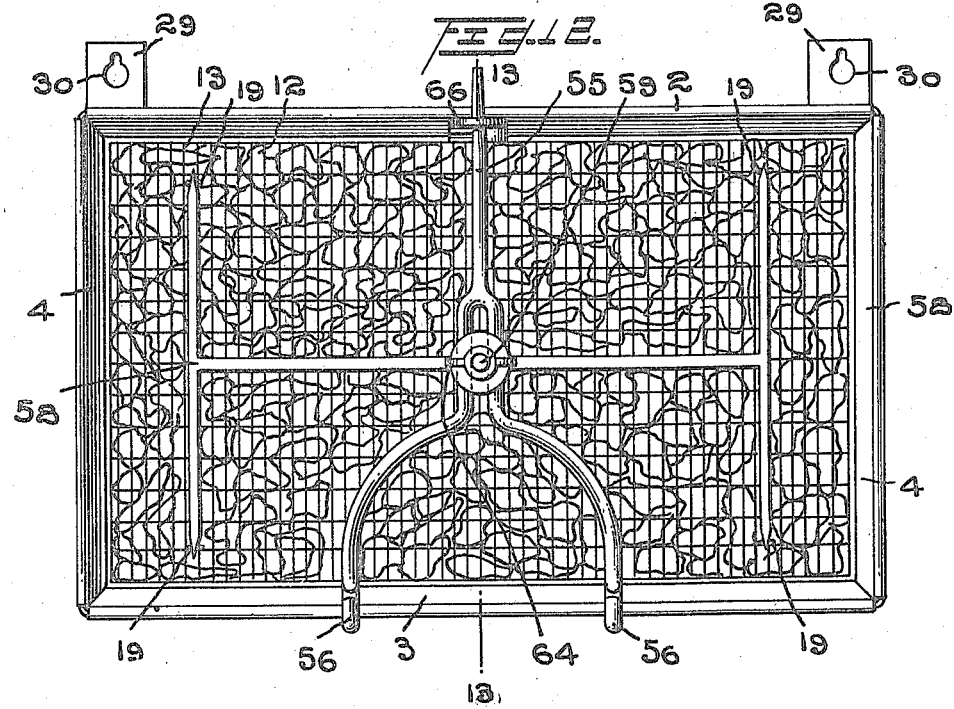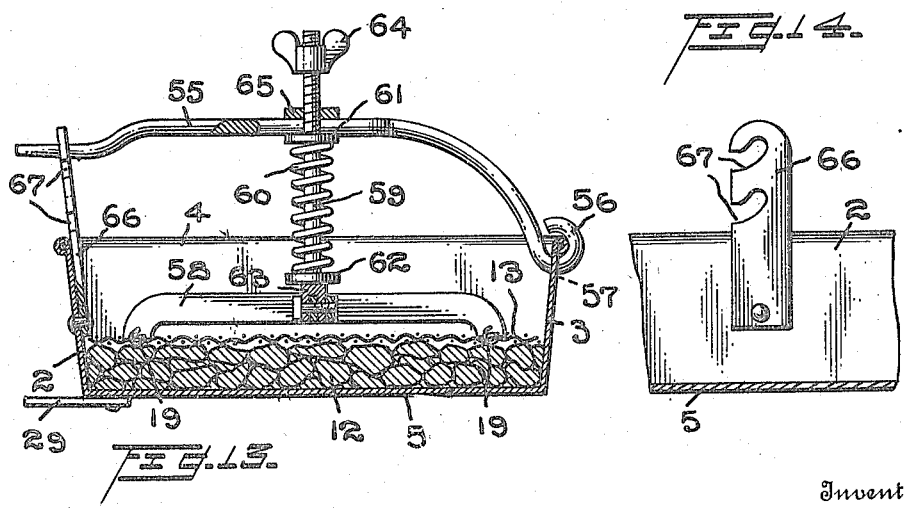

WALTER F. DREIBELBIS, OF ROYERSFORD, PENNSYLVANIA.

CHICKEN-FEEDER.

1,143,756.  Specification of Letters Patent.  Patented June 22, 1915.

Application filed December 1, 1914. Serial No. 875,035.

*To all whom it may concern:*

Be it known that I, WALTER F. DREIBELBIS, a citizen of the United States, residing at Royersford, in the county of Montgomery and State of Pennsylvania, have invented certain new and useful Improvements in Chicken-Feeders, of which the following is a specification.

My invention relates to improvements in chicken feeders, the object of the invention being to provide a device designed for holding relatively large articles of food, and permitting ready access to the food, yet preventing the food from contact with the ground.

It is a well known fact that left over articles of food from the table constitute excellent food for chickens, but in order that the best results may be had, it is absolutely necessary for such food to be maintained in a clean and sanitary condition. When such articles of food are given to the chickens, they drag the same about the yard, and the food becomes filthy. With my improvements, such articles of food as meat, vegetables, ears of green sweet corn, lettuce, bread, etc., can be held in convenient reach of the chickens so that every particle of the food can be removed, but in small quantities just sufficient for swallowing, and contact of such food with the ground or other sources of contamination is absolutely prevented.

A further object is to provide a device of the character stated which is designed to be suspended on a wall or support above the ground, and which is provided with a screen having a spring-pressed frame over the screen, secured to the screen and exerting pressure against the food to hold the screen at all times against the food, and the latter in convenient reach of the chickens.

With these and other objects in view, the invention consists in certain novel features of construction and combinations and arrangements of parts as will be more fully hereinafter described and pointed out in the claims.

In the accompanying drawings: Figure 1 is a perspective view illustrating my improvements. Fig. 2 is a view in longitudinal section through the center of the device. Fig. 3 is a fragmentary view in vertical section illustrating one of the hangers in section. Fig. 4 is a fragmentary view in longitudinal section illustrating a modification. Fig. 5 is a view in section on the line 5—5 of Fig. 4. Fig. 6 is a view similar to Fig. 4 illustrating another modification. Fig. 7 is a view in section on the line 7—7 of Fig. 6. Fig. 8 is a view in transverse section on the line 8—8 of Fig. 6. Fig. 9 is a view similar to Fig. 2 illustrating another modification. Fig. 10 is a view in section on the line 10—10 of Fig. 9. Fig. 11 is a view in section on the line 11—11 of Fig. 9. Fig. 12 is a plan view illustrating another modification. Fig. 13 is a view in section on the line 13—13 of Fig. 12, and Fig. 14 is a fragmentary view illustrating the bar locking strip 66.

1 represents a casing, preferably, although not essentially, of sheet metal having its upper and lower walls 2 and 3, and its end walls 4 at an angle to its rear wall 5, so that moisture can drain from the casing when the latter is in a vertical position.

The rear wall 5 which constitutes the back of the casing has a central opening 6 for the reduced screw-threaded end 7 of a post 8. A nut 9 is screwed onto the reduced screw-threaded end 7, and reinforcing plates 10 are located at opposite sides of the rear wall 5 to form a strong and rigid mount for the post 8. The post 8 is located centrally in the casing, projects forwardly beyond the casing, and the plates 10 are securely clamped between the nut 9 and a shoulder 11 on the post formed at the juncture of the reduced end 7 with the larger diameter of the post. By reason of this construction, the tightening of the nut 9 rigidly fixes the post 8 at right angles to the rear wall 5.

13 represents a screen which is preferably of wire, and of a mesh large enough to permit the chicken to insert its bill between the mesh and remove particles of food 12 between the screen and the rear wall of the casing. The openings between the wires are of greater height than width, which is desired to permit the removal of the food, and the screen 13 has a central opening 14 for the post 8, so that it is free to move on the post. To the outer face of the screen 13, I secure frames 15. These frames 15 consist of a pair of arched bars 16 connected by an integral bar 17. The arched bars 16, at their free ends are recessed as shown at 18 to receive the wires of the screen, and short securing wires 19 are positioned around the wires of the screen and through openings 20 in the ends of the arched bars 16, securely tying the screen to the arched bars.

It will be noted that the free ends of the arched bars 16 are sharp, so that they offer practically no obstruction and the chicken can pick out every particle of food through every mesh of the screen. The bars 17 of the frames 15 are provided with outwardly projecting perforated ears 53, which are pivotally secured in the bifurcated ends of a connecting bar 21 by means of pins 22. This connecting bar, and the two frames 15 constitute what I shall hereinafter refer to as a "pressure frame", and by reason of the pivotal connection of the bar 21 with the frames 15, a pressure upon the center of bar 21 will be equally distributed throughout the screen, and the screen will be uniformly held against the food 12 back of the screen.

The post 8, above referred to, is formed with a longitudinal slot 23 in which the bar 21 is positioned, and a coiled spring 24 around the outside of the post 8 exerts a pressure upon the bar 21 to maintain the screen against the food. To regulate the pressure of the spring 8, and to secure the parts in assembled relationship, I provide a plunger 25 which constitutes a bar of flat metal located in the slot 23 of post 8, and at its inner end recessed as shown at 26 to project into the spring 24 and bear against the outer end thereof.

27 represents a transverse pin carried by the plunger 25, and movable into any of a series of angle recesses 28 in the post 8. The outer end of the plunger 25 is provided with an enlargement 33 to facilitate the manipulation thereof, and this plunger may be moved to regulate the pressure of the spring and also to permit the spring and the several parts of the device to be separated.

When it is desired to place food in the casing, the plunger 25 is removed, which permits the spring 24 to be removed from the post and the screen 13 with its pressure frame, separated from the casing. When the food is in place, the screen and its pressure frame is inserted in the casing, spring 24 is placed around post 8, and the plunger 25 forced into position to put the spring under tension and exert the necessary pressure against the screen. Hangers 29 are pivotally connected to the rear wall 5 of casing 1, and are made with openings 30 to receive nails 31 on the support 32. The openings 30 are relatively large at one end to accommodate the heads of the nails, and at their upper ends are relatively small so as to fit back of the heads of the nails and prevent the device from accidental removal.

In Figs. 4 and 5, I illustrate a modification in which the post 34, corresponding to post 8, is provided with a series of openings 35 to receive a removable pin 36 connecting the plunger 37 to the post. This plunger 37 operates like the plunger 25 to hold the spring 24 in operative position, but the adjustment is by means of the removable pin as above explained.

In Figs. 6, 7, and 8, I illustrate another modification in which the post 38, corresponding to post 8 is formed by bending a channel bar between its ends, so that the post is of general rectangular form as shown clearly in Fig. 8 with the two halves or sections of the posts spaced apart to accommodate between them the plunger 39. This plunger 39 has a pin 40 engaging in angular recesses 41 in the post, and at its lower end is provided with a follower 42 bearing against the end of the spring 43, the latter housed within the post, and at its inner end bearing against the bar 21. To form the post, the side flanges of the channel bar are cut away at a point intermediate the ends of the channel bar, and then the two halves of the channel bar are bent upwardly at right angles to the portion of the bar where the side flanges are cut away, so that this last-named portion of the bar constitutes the base of the post, and the two halves of the channel bar face each other to form a structure of general rectangular shape in cross section. This shape of the post is clearly shown in Fig. 8. The post 38 is secured to the casing by means of a bolt 44, the square head 45 of the bolt fitting within the post and the bolt is projected through the bottom of the post and through the casing, and secured by a nut 46. Reinforcing plates 10 are interposed between the post and the inner face of the casing and between the nut and the outer face of the casing as in the preferred form to strengthen the mounting for the post.

Figs. 9, 10, and 11 illustrate another modification in which a slotted post 47 is secured to the casing 1, but is relatively short. In this modification I employ a longitudinal bar 48 to bear against the outer end of the spring 24, and press the same against the pressure frame 21. This bar 48 is arched, and at one end is connected by a short chain 49 with a hook 50 secured to one end of casing 1. The other end of the bar is provided with a plurality of slots 51 to receive in any of them a hook 52 on the opposite end of the casing. By means of this series of slots 51, the position of the bar 48 can be adjusted to regulate the pressure of the spring in accordance with the amount of food in the casing.

Figs. 12, 13, and 14 illustrate another modification in which I dispense altogether with a central post 8, and secure the screen 13 by means of a forked bar 55. This bar 55, at its forked end, is provided with hooks 56 which project through openings 57 in the bottom 3, and operate not only to couple the parts together, but as a hinge to permit the bar and the parts carried thereby to be swung out of the way when desired. To the screen 13, I secure a frame 58 corresponding to one of the frames 15 of the preferred form. To this frame 58, I pivotally connect a bolt 59 which extends upwardly from the frame and extends through the two sections of the forked end of bar 55. A coiled spring 60 is positioned around the bolt 59 between a washer 61 against bar 55, and a washer 62 against an enlargement 63 adjacent the pivoted lower end of the bolt. 64 is a thumb nut adjustable on the outer end of bolt 59 which limits the movement of bar 55 on the bolt, and a washer 65 is preferably interposed between the nut 64 and the bar 55. 66 represents a locking strip which is pivotally connected to the top 2, so that it can be swung down out of the way during shipment. This strip 66 is provided in one edge with a plurality of recesses 67 to receive in any of them the free end of bar 55, and by reason of this adjustment, the tension of the spring can be varied to exert the necessary pressure on the screen. With this form of my improvements, the bar 55 can be swung from over the casing 1 and carry with it all of the parts including the screen 13, hence permitting the food to be inserted or removed without difficulty.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A chicken feeder, comprising a casing having a rigid slotted post extending from the center thereof, a screen having an opening therein receiving the post, and a bar adjustably secured in the slotted post and connected to the screen, substantially as described.

2. A chicken feeder, comprising a casing, a screen movable in the casing, a pair of frames secured to the screen, a bar pivotally connected at its ends to the frames, a central post in the casing having a slot receiving the bar, and elastic means adjustably secured to the post and engaging the bar, substantially as described.

3. A chicken feeder, comprising a casing, a screen movable in the casing, a pair of frames secured to the screen, a bar pivotally connected at its ends to the frames, a central post in the casing having a slot receiving the bar, a spring on the post engaging the bar, and an adjustable member connected to the post and bearing against the outer end of the spring, substantially as described.

4. A chicken feeder, comprising a casing having a central rigid post, a screen movable in the casing, a pressure frame connected to the screen and having a bar engaging the post, a spring around the post engaging the bar, a plunger positioned against the outer end of the spring, said post having a plurality of openings therein, and a pin connected to the plunger and engaging in any of the openings, substantially as described.

5. A chicken feeder, comprising a casing, a central slotted post rigidly fixed to the casing, a screen movable in the casing and having an opening receiving the post, a pair of frames, each frame consisting of parallel arched bars, and a bar connecting them, the arched bars having sharpened recessed ends receiving the wires of the screen, flexible devices securing the ends of the arch shaped bars to the wire of the screen, a bar pivotally connecting the two frames, and projecting through the slot of the post, and a spring on the post exerting pressure against the last-mentioned bar, substantially as described.

6. A chicken feeder comprising a casing having a central slotted post, a wire screen in the casing, a pressure frame against the outer face of the screen, said pressure frame having a bar located in the slot of the post, a spring guided by the post and engaging the bar, a plunger in the slotted post engaging the outer end of the spring, said post having a plurality of angular recesses, and said plunger having a transverse pin movable into any of the recesses, substantially as described.

7. A chicken feeder, comprising a casing, a screen in the casing, a frame secured to the screen, said frame comprising a pair of arched bars having their ends sharpened and recessed to receive the wires of the screen, devices securing said ends of the arched bar to the screen, and elastic means exerting pressure on the frame pressing the screen inwardly, substantially as described.

8. A chicken feeder, comprising a casing, a screen in the casing, a frame secured to the screen, said frame comprising a pair of arched bars having their ends sharpened and recessed to receive the wires of the screen, devices securing said ends of the arched bar to the screen, elastic means exerting pressure on the frame pressing the screen inwardly, and means permitting the adjustment of pressure of said elastic means, substantially as described.

In testimony whereof I have signed my name to this specification in the presence of two subscribing witnesses.

WALTER F. DREIBELBIS.

Witnesses:
C. A. LAUNER,
H. E. ANDERSON.

Copies of this patent may be obtained for five cents each, by addressing the "Commissioner of Patents, Washington, D. C."